April 2, 1929.  A. L. ROBERTS  1,707,876
BRAKE MECHANISM
Filed April 15, 1927    5 Sheets-Sheet 1
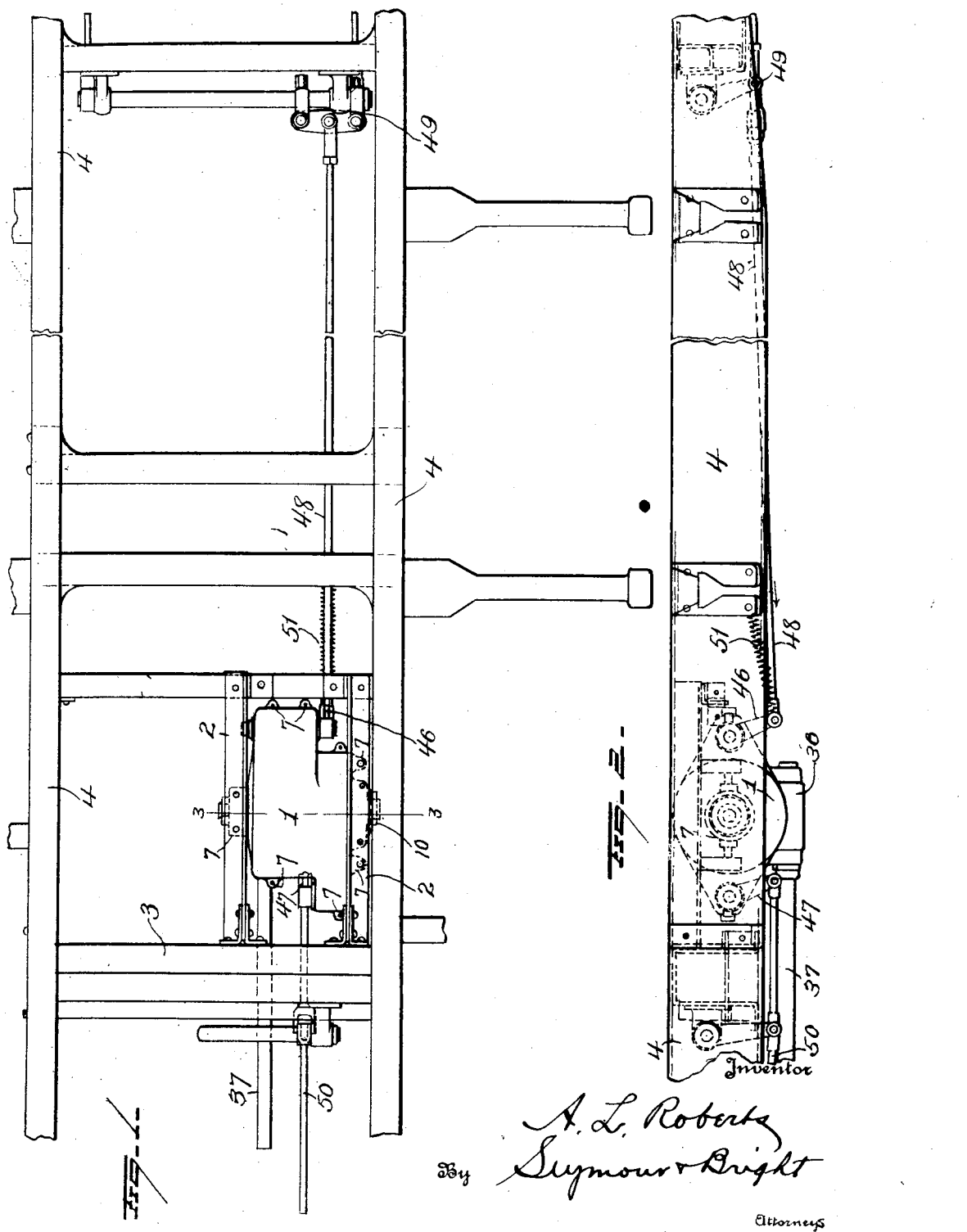

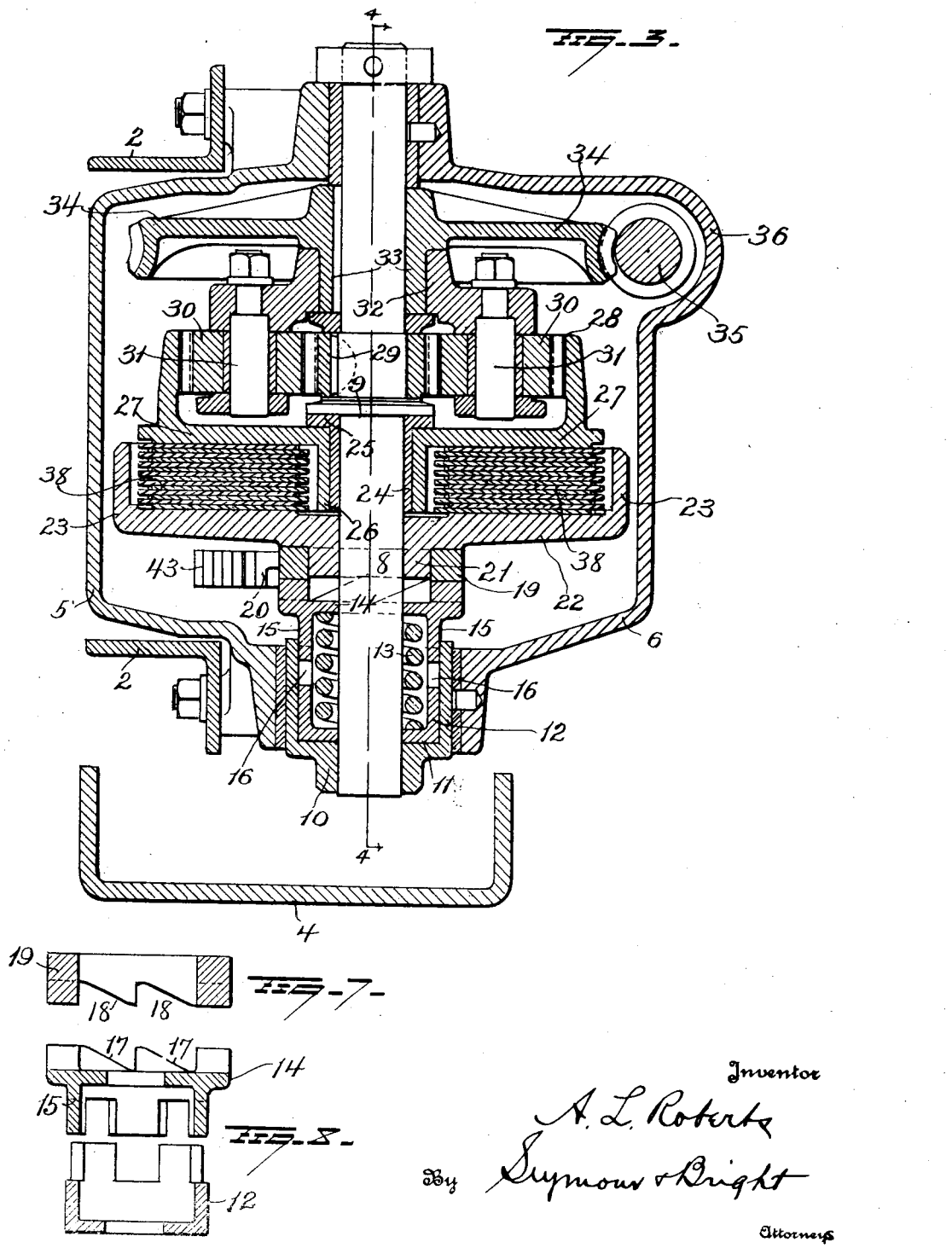

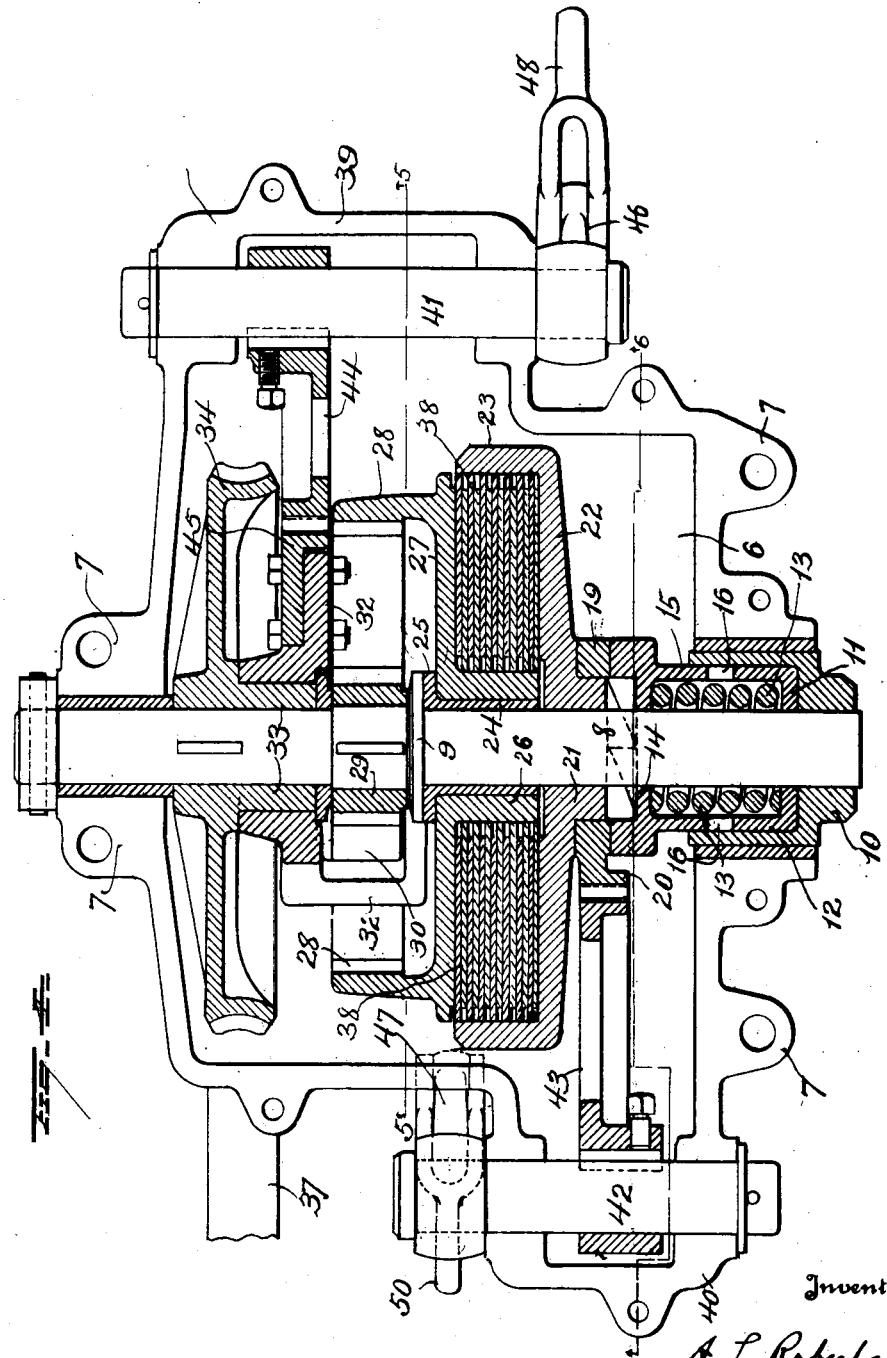

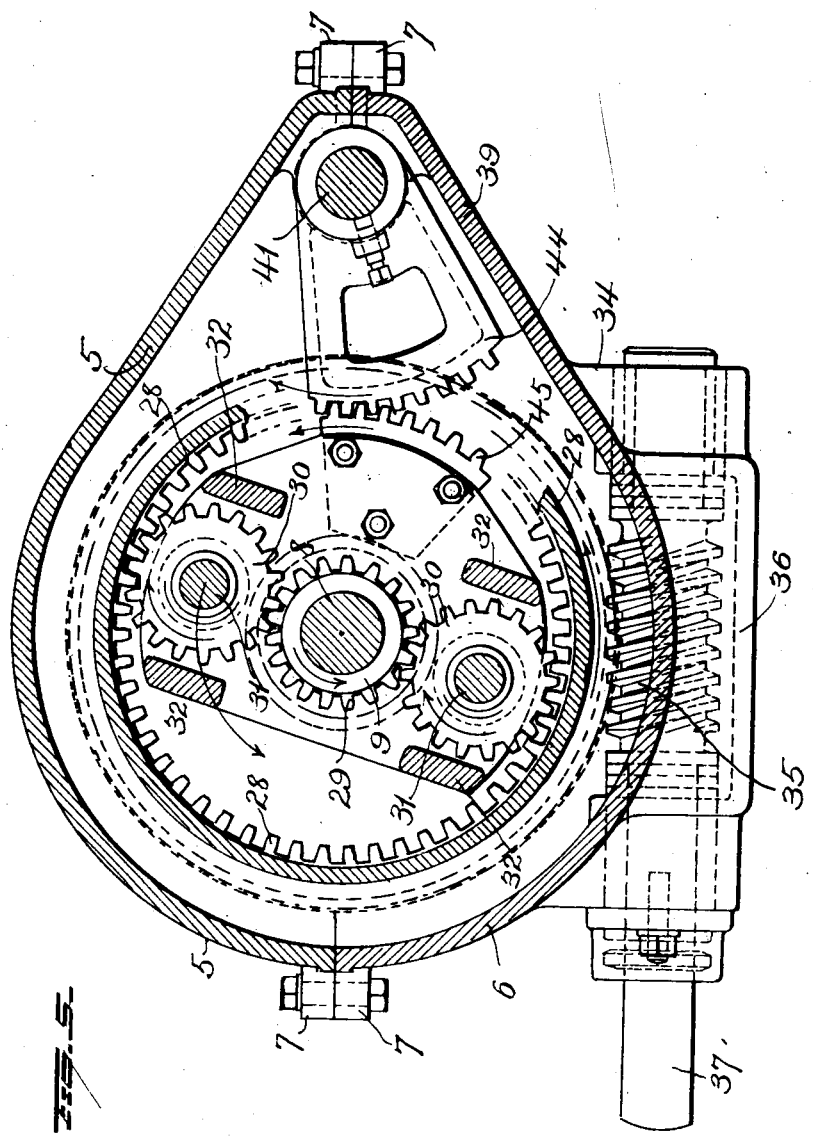

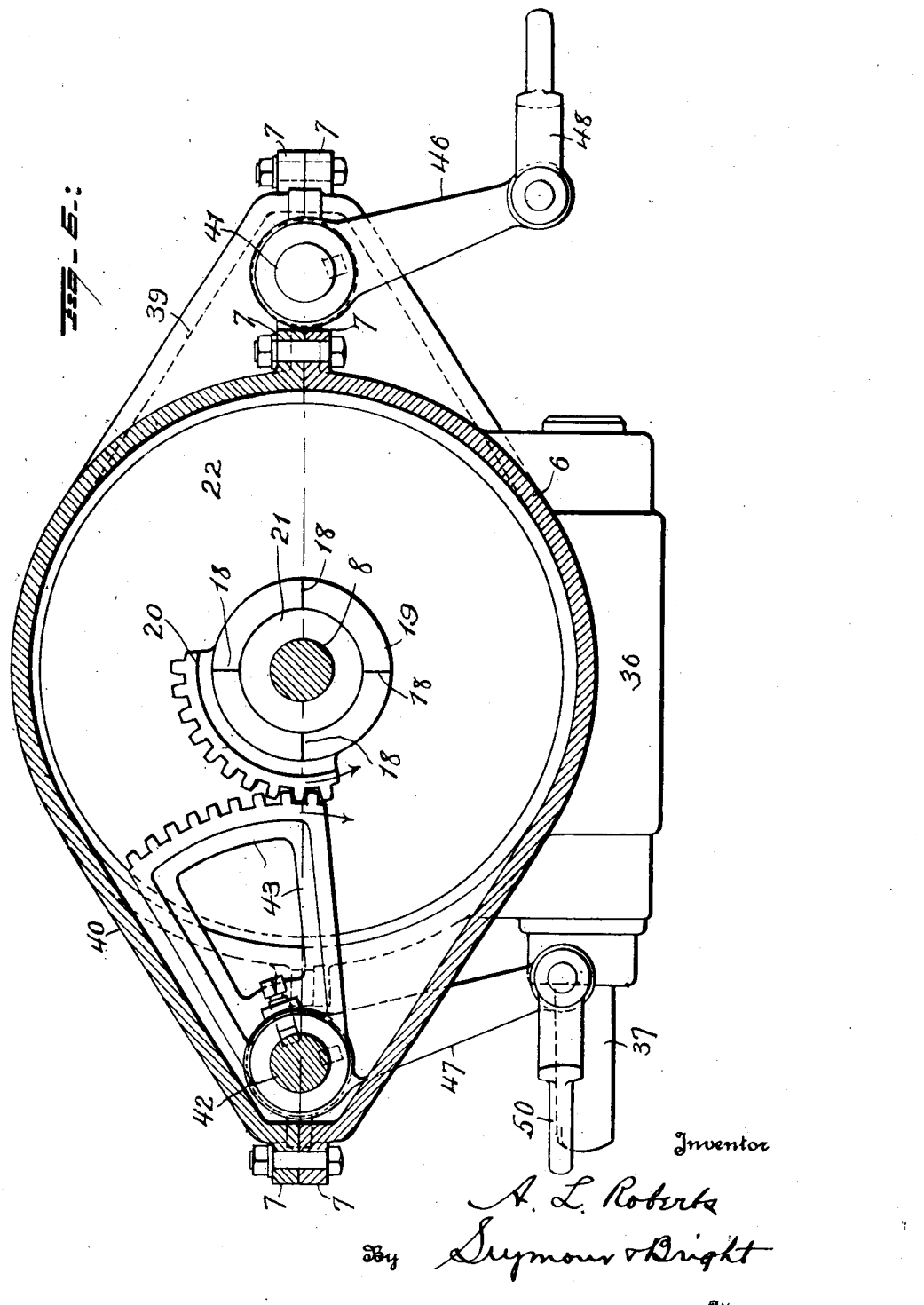

Patented Apr. 2, 1929.

1,707,876

UNITED STATES PATENT OFFICE.

ALVIN L. ROBERTS, OF PHILADELPHIA, PENNSYLVANIA.

BRAKE MECHANISM.

Application filed April 15, 1927. Serial No. 183,998.

This invention relates to brakes of that class in which the power of an engine or the momentum of a vehicle is utilized to apply the brakes, mechanical force being substituted for human strength and the operator being relieved of strain and fatigue while certainty in the application of the brakes is attained. The present invention provides a simple, compact and easily operating mechanism of novel form and arrangement by which the brakes will be efficiently applied whether the vehicle be running forwardly or backwardly, and is especially desirable on large motor trucks and busses. The invention is illustrated in the accompanying drawings and will be hereinafter fully set forth and particularly defined.

In the drawings, Figure 1 is a plan view of a portion of a motor vehicle chassis having my brake mechanism mounted thereon;

Figure 2 is a side view of the same;

Figure 3 is an enlarged section on the line 3—3 of Figure 1;

Figure 4 is a section on the line 4—4 of Figure 3;

Figure 5 is a section on the line 5—5 of Figure 4;

Figure 6 is a section on the line 6—6 of Figure 4;
Figures 7 and 8 are detail views showing the interlocking cam members.

Referring to Figures 1 and 2, it will be noted that the casing or housing 1 is secured to longitudinally extending angle bars 2 which are rigidly secured to transverse angle bars 3, the latter being in turn rigidly secured to the chassis side bars or sills 4.

The casing or housing is formed in two sections 5, 6 having their edges in abutting relation and provided with mating lugs 7 through which fastening bolts are inserted to secure the sections together in an obvious manner. A central shaft 8 is disposed within the casing on the transverse axis thereof and is provided approximately midway its ends with an annular rib 9, the ends of the shaft being rotatably mounted in the ends of the casing and one end of the shaft having an adjustable collar or nut 10 fitted thereon.
The collar encircles an abutment ring 11 which is slidable on the shaft 8 and has an annular flange 12 which is spaced from the shaft to enclose one end portion of an expansion spring 13 coiled around the shaft.
An abutment member 14 receives the thrust of the spring and is constructed with a hub or sleeve-like extension 15 fitting around the spring and having longitudinal projections interlocking with similar projections on the flange 12, as shown at 16, whereby relative longitudinal movement of the abutment members will be permitted but relative rotation will be prevented and the spring will be housed at all times. On the inner face of the abutment member 14 is an annular series of cam projections 17 which mate and cooperate with similar projections 18 on a cam 19 having a spur gear 20 formed upon a portion of its peripheral extent. The combined cam and gear 19 is rotatably fitted on the hub 21 of a clutch disk 22 which is loosely fitted on the shaft 8 and is provided at its edge with an overhanging annular flange 23 projecting from the disk in the opposite direction to the hub. A bushing 24 is fitted on the shaft 8 between clutch disk 22 and the rib 9 and has a flange 25 abutting the rib, and the hub 26 of a second clutch disk 27 is mounted on the housing against the flange 25. At its edge, the clutch disk 27 carries an internal gear 28 and in the plane of said gear a pinion 29 is keyed to the shaft 8 immediately adjacent the rib 9. Disposed between and meshing with the pinion 29 and the internal gear 28 are planetary pinions 30 mounted on axle pins or studs 31 which are carried by a frame 32 rotatably fitted on the hub 33 of a worm gear 34 which is keyed on the shaft 8. Said worm gear is in mesh with a worm 35 which is journaled in a bearing sleeve 36 on the bottom of the casing 1 and is formed on the rear end of a driving shaft 37 which is connected with the power take-off of the motor or with the vehicle propelling shaft so that whenever the motor is running or the vehicle is traveling the worm gear and the shaft 3 will be rotating.

Between the clutch disks 22 and 27 are arranged a plurality of circular friction clutch plates 38, the alternate plates being connected to the respective disks. Normally the plates may slip freely on each other and the spring 13 is just balanced and not under tension but an increase in the force applied to the spring will cause the clutch plates to frictionally engage so that their relative movement will be resisted.

The casing 1 is formed with extensions 39 and 40 at its rear and front respectively, and rock shafts 41 and 42 are mounted in the respective extensions. A gear sector 43 is carried by the shaft 42 within the casing and meshes with the rack or gear 20 on the cam member 19, while a similar gear sector 44 on the shaft 41 meshes with the rack or gear 45 on the frame 32. Crank arms or levers 46, 47 are secured on and depend from the outer ends of the shafts 41, 42, respectively, and a connecting rod 48 extends rearwardly from the crank 46 to the brake rigging, indicated generally at 49. A connecting rod 50 extends forwardly from the crank 47 to be attached to a pedal or a hand lever for setting the brake, and a spring, indicated at 51 and which may be arranged at any convenient point, holds the brakes normally released and all the parts in the positions illustrated in the drawings.

The operation will be readily understood. Since the worm shaft 37 may be connected to and driven directly by the engine, said shaft, worm gear 34, shaft 8 and center pinion 29 will be in motion, when thus connected, as long as the engine is running. If the worm shaft be driven by power derived from the take-off shaft, which is usually located at the rear of the transmission and the clutch, the momentum of the vehicle will effect rotation of the worm shaft when the clutch is released. As the center pinion 29 rotates continuously, either the internal gear 28 or the frame 32 carrying the planetary gears 30 may be stationary but not both at the same time. When the center pinion 29 rotates, the planetary gears 30 will rotate in the opposite direction about their respective axes and, if the frame 32 be held stationary, the internal gear 28 will rotate in the opposite direction to the center pinion whereas if the internal gear be held stationary the frame 32 will rotate in the same direction as the center pinion. The spring 51 holds the brakes in the off position and the same force resists movement of the sector 44 which is geared to the frame 32 so that said frame is held stationary and the internal gear rotates about the pinions, the clutch plates 38 being in the open position. When the brakes are to be applied, the operator actuates the hand lever or foot pedal so as to exert a pull through the rod 25 which will rock the sector 43 and turn the cam gear 19 on the hub of the clutch disk 22, whereupon the cam or ratchet projections on the member 19, cooperating with the like projections on the abutment member 14, cause said members 14 and 19 to move apart. The pressure of the spring 13 is thereby increased and the member 19 and clutch disk 22, consequently, are caused to move along the shaft 8 and bring the clutch plates 38 into closer frictional contact with each other and the clutch disk 27, a drag or resisting effort upon the internal gear being thereby created. The planetary pinions 30 will then tend to roll on the internal gear and turn the frame 32, the result being a torque translated through the frame and the sector 44 into a pull exerted through the brake rod 48 to apply the brakes, although the internal gear continues to rotate. As more muscular power is applied to the pedal or the hand lever, the pull in the brake rod 48 increases up to the capacity and adjustment of the spring 13, the braking pressure being always proportional to the pressure applied to the foot or hand lever, which pressure, however, is very slight compared to that required when the brakes are operated solely by muscular effort. After the vehicle has been brought to a stop, the usual hand brake may be set to hold the vehicle while standing or the spring 13 may be held under compression.

It is assumed, of course, that enough power is derived from the engine to always apply the brakes under all conditions, the function of the spring and friction clutch being to utilize or draw off, as from a reservoir, such amount of this power as may be needed from time to time to accomplish the purpose of this apparatus. With the spring compressed to its full capacity, the clutch plates continue to slip on each other as the internal gear must rotate as long as it derives power and motion from the central gear. It is to be noted that the casing or housing completely encloses the mechanism which may, therefore, run in oil so that the wear upon the clutch plates is not excessive, especially as the period of application of the brakes is generally very short and a large number of clutch plates are employed so that the wear is distributed over a very considerable area.

Having fully described my invention what I claim as new and desire to secure by Letters-Patent, is:—

1. In a power brake mechanism, the combination of a rock shaft, a crank thereon connected with the brakes, a sector on said shaft, a frame mounted for oscillation and geared to the sector, planetary gears mounted on said frame, power-driven means for rotating said gears, an internal gear meshing with the planetary gears, a normally-open clutch at the side of and cooperating with the internal gear, and muscularly operated means for closing said clutch to induce resistance of the motion of the internal gear whereby the frame will be caused to act through the geared sector and apply the brakes.

2. In a power brake mechanism, the combination of spaced clutch disks having a common axis, friction clutch plates disposed between the clutch disks in alternating series, each series being carried by one of the disks, an internal gear carried by one of the disks at the periphery thereof, planetary gears meshing with the internal gear, power-driven means for rotating said gears, an oscillatory frame carrying said gears and operatively connected with the brakes, and means acting upon the side of the outer clutch disk to effect close frictional engagement between the disks and clutch plate whereby the motion of the internal gear will be resisted and the frame actuated to apply the brakes.

3. In a power brake mechanism, the combination of a pair of normally free clutch disks, power-driven planetary gearing connected with one of the disks, the intermediate elements of the gearing being operatively connected with brake elements, a pair of opposed cam members at the side of and bearing against the other clutch disk, and means for rotating one of said cam members whereby it will move from the other cam member and hold the clutch disks in frictional engagement to cause the gearing to apply the brakes.

4. In a power brake mechanism, the combination of a pair of clutch disks, a power-driven planetary train of gearing including an element on one of the disks, means connecting intermediate elements of the train with brake elements, a rotatable member mounted against the side of the other disk and having lateral cam surfaces, an abutment member provided with lateral cam surfaces mating with the cam surfaces on the rotatable member, and a spring holding said members in lateral contact whereby turning of the rotatable member will move the clutch disks together to resist relative turning.

5. In a power brake mechanism, the combination of a central shaft, a pinion fixed thereon, a worm gear fixed on the shaft in spaced relation to the pinion, a power shaft continuously driving the worm gear, a frame loosely mounted on the central shaft between the pinion and the worm gear, means operatively connecting the frame with brake elements and holding the frame normally stationary, pinions carried by the frame and meshing with the pinion on the central shaft, a normally free internal gear concentric with the central shaft and meshing with the pinions on the frame, and means for resisting the movement of the internal gear to effect rocking of the frame and application of the brakes.

6. In a brake mechanism, the combination of a rock shaft, means whereby said shaft may be connected with brakes, a sector on said shaft, a frame mounted for oscillation and geared to the sector, planetary gears mounted on said frame, power driven means for rotating said gears, a gear meshing with the planetary gears, a normally-open clutch cooperating with said gear, and muscularly operated means for closing said clutch to induce resistance of the motion of said gear whereby the frame will be caused to act through the geared sector and apply the brakes.

In testimony whereof, I have signed this specification.

ALVIN L. ROBERTS.